July 25, 1933. H. J. BROWNLEE 1,919,878
PROCESS FOR MANUFACTURING FURFURAL
Filed Jan. 16, 1928
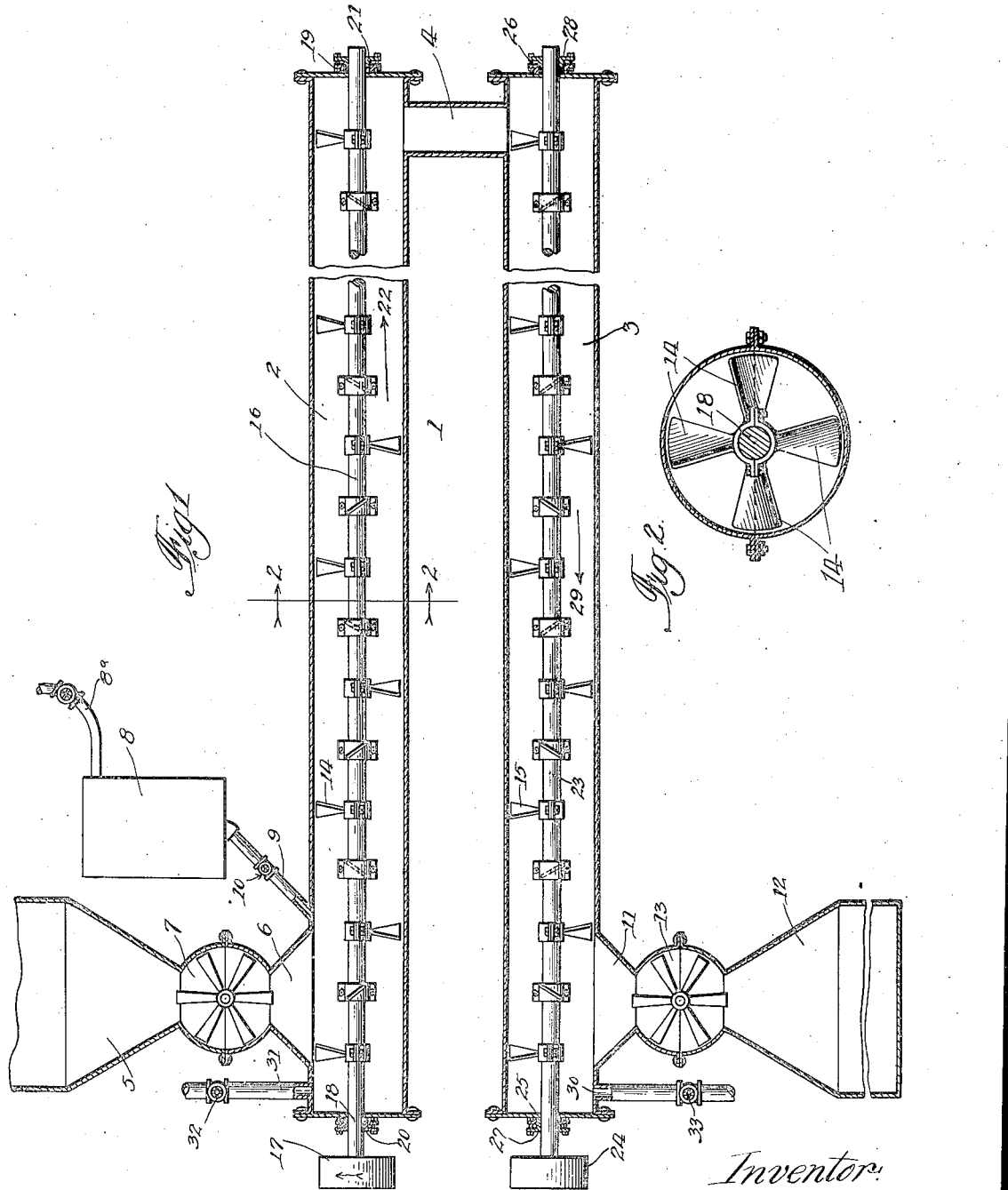

Patented July 25, 1933

1,919,878

UNITED STATES PATENT OFFICE

HAROLD J. BROWNLEE, OF CEDAR RAPIDS, IOWA, ASSIGNOR TO THE QUAKER OATS COMPANY, OF CHICAGO, ILLINOIS, A CORPORATION OF NEW JERSEY

PROCESS FOR MANUFACTURING FURFURAL

Application filed January 16, 1928. Serial No. 246,976.

My invention relates to improvements in processes and apparatus for manufacturing furfural and other volatile organic substances, and it has special reference to a process whereby such substances may be continuously formed and continuously removed from the pentosan-bearing or furfural-yielding material which is continuously supplied to and, after having been processed, is continuously withdrawn from the reaction chamber.

More particularly my present invention pertains to a process and apparatus of the character described above that is particularly adapted to manufacture furfural and volatile organic substances from materials such as oat hulls, rice hulls, corn cobs, cotton seed hulls or other suitable pentosan-bearing materials from which such volatile organic substances may be produced and recovered in quantities commensurate with commercial requirements and economical production.

Several processes for manufacturing furfural and other valuable volatile organic substances from pentosan-bearing materials have been proposed, but my present process is distinguished from those of the prior art in that it is a continuous process in which the furfural-yielding materials are treated with steam in such manner that, in addition to other unexpected economies, distillates are procured that, at all times, are substantially uniform in composition. As a consequence, I am able to secure a very high yield of furfural per unit weight of the furfural-yielding material with the expenditure of a minimum quantity of steam.

An object of my present invention is to provide a process and apparatus for practicing the same, whereby furfural may be continuously formed and continuously removed from the furfural-yielding materials that are being processed so as to procure continuously a distillate that is substantially uniform in composition which contains a very high furfural content.

Another object of my present invention is to provide a process and apparatus of the character hereinbefore indicated whereby furfural is formed and removed continuously from a supply of furfural-yielding material, such as oat hulls, which is fed continuously into, through and out of a suitable digester wherein the furfural-yielding material is subjected to heat, pressure and a current of steam flowing counter to the direction of flow of the furfural-yielding material through the digester and withdrawn through an opening adjacent to the materials richest in furfural.

For a better understanding of the nature, scope and characteristic features of my present invention, reference may now be had to the following description and the accompanying drawing, in which Figure 1 is a diagrammatic view of an apparatus embodying one form of my invention and by means of which my present process may be practiced; and Fig. 2 is a sectional view taken along the line 2—2 of Fig. 1 and showing a form of paddle that may be employed in my apparatus for the purpose of continuously advancing the furfural-yielding material, such as oat hulls, longitudinally along the digester for the purpose of subjecting the oat hull material continuously to the action of heat, pressure and the counter flow of steam.

My present apparatus comprises a digester or auto-clave 1 that constitutes a plurality of sections 2 and 3 connected to each other by means of a passageway 4. The end of the digester section 2 opposite to the passageway 4 is placed adjacent to an oat hull bin 5 and is in communication therewith through an ingress opening 6 and an interposed gas-tight valve 7. An acid pressure tank 8 feeds into the digester section 2 through a pipe 9 which is provided with a control valve 10. The tank 8 is provided with a pressure supply line 8a having a control valve therein. This allows the liquid from the tank 8 to be fed by gravity into the digester. The pipe 9 admits an acid solution into the digester section 2 adjacent to the ingress opening 6 through which the oat hulls or other furfural-yielding materials are fed into the digester. At the end of the digester section 3 opposite to the passageway 4 is an egress opening 11 which communicates with a bin 12 through an interposed gas-tight valve 13.

The digester sections 2 and 3 are respectively provided with rotatably mounted paddles 14 and 15. The paddles 14 are mounted upon a shaft 16 that extends longitudinally of the section 2 and the outer end of which is provided with a driving pulley 17 or any other suitable means that may be connected to any available source of power for propelling the shaft 16. The shaft 16 is rotatably mounted in bearings 18 and 19 which are provided with gas-tight packing joints 20 and 21 respectively. The paddles 14 are so designed that the materials being processed are fed continuously and axially along the digester section 2 in the direction of the arrow 22. The passageway 4, which serves as a communication between the digester section 2 and the digester section 3, admits the reaction materials, as they are passed out of the digester section 2, into the digester section 3, the latter being provided with the paddles 15 that are mounted on a rotatable shaft 23 which is also provided at its outer end with a driving pulley 24. Any suitable source of power may be connected to the driving pulley 24 to rotate the shaft 23 which is mounted in the end bearings 25 and 26. Gas-tight packing joints 27 and 28 are placed adjacent to the bearings 25 and 26 respectively. The paddles 15 are so designed that, as the shaft 23 rotates, the materials being processed are fed axially along the digester section 3 in the direction of the arrow 29 or, in other words, away from the passageway 4 towards the egress opening 11 and gas-tight valve 13.

By reason of the gas-tight valves 7 and 13 placed respectively in the ingress passageway 6 and egress passageway 11 and the gas-tight packing joints 20, 21, 27 and 28, the digester comprising the sections 2 and 3 is properly sealed so as to permit a substantial steam pressure to be held within the digester during the operation of the apparatus.

Steam is supplied to the digester through the passageway 30 which is placed in proximity to the egress passageway 11. A vapor outlet 31 is connected to the digester in proximity to the ingress passageway 6. The vapor outlet line leads to any suitable distilling apparatus, not shown, which is well known in the art and which, of itself, forms no part of my present invention.

From the foregoing, it will be observed that the furfural-yielding materials comprising the reaction mixture traverse the digester section 2 in the direction of the arrow 22, the same being advanced by the rotatable paddles 14 from the ingress opening 6 toward the discharge passageway 4. The passageway 4 admits the reaction mixture into the digester section 3 wherein it is moved by the rotatable paddles 15 in the direction of the arrow 29 towards the egress passageway 11. The reaction mixture comprising the oat hulls or other furfural-yielding materials and the acid liquid is admixed in proximity to the ingress opening 6. The flow of steam enters the live steam inlet 30, flows counter to the direction of movement of the reaction mixture in the digester section 3, passes through the passageway 4 wherein it flows counter to the direction of movement of the reaction mixture, and then passes towards the vapor outlet 31 flowing counter to the direction of movement of the reaction mixture within the digester section 2. In other words, live steam is admitted in proximity to the egress passageway of the digester and, at all points in the system, flows counter to the direction of movement of the reaction mixture. The vapors emitted from the outlet 31 contain the furfural and other volatile organic substances that are developed within the digester, as well as the live steam over that necessary to maintain the reaction temperature and pressure.

The reaction mixture, after the volatile organic substances, such as furfural have been removed therefrom, is continuously discharged through the egress opening 11 and interposed gas-tight valve 13 into the residue bin 12. The flow of steam through the digester is controlled by means of a valve 32 placed in the vapor outlet 31 and another control valve 33 that may be provided in the live steam inlet 30. By regulating the valves 32 and 33 the desired flow of steam through the digester may be controlled and the steam pressure within the digester may be maintained substantially constant at any predetermined value.

The foregoing constitutes a description of a form of apparatus embodying my invention which comprises a digester into and from which the furfural-yielding materials are continuously supplied and withdrawn, said digester being provided with means whereby the flow of live steam or other gaseous carrier agent may, at all times, be counter to the direction of movement of the reaction mixture through the digester.

I will now describe my invention for manufacturing furfural in a continuous manner. Assuming for the purpose of illustration only that the bin 5 contains one ton of oat hulls, the acid liquid supplied to this ton of oat hulls through the supply line 9 comprises approximately 500 pounds of water and 40 pounds of sulfuric acid, 95% strength. The oat hulls and the acid liquid may be thoroughly intermixed before admitting the reaction mixture into the digester, or the oat hulls and the acid liquid may be separately admitted into the digester and the intermixing thereof effected adjacent to the ingress opening 6. In the latter case, the oat hulls and the acid liquid are thoroughly stirred together to secure intimate intermixture by the revolving paddles 14 disposed adjacent to the ingress opening 6. Of course, any suitable means may be provided for mixing the oat hulls with the acid liquid and for this reason I have described one method only for accomplishing this result, namely, the method wherein the oat hulls and the acid liquid are fed separately into the head of the digester and the thorough intermixing of the reaction mixture is effected within the digester.

Of course, the oat hulls as they are fed from the bin 5, and the acid liquid as it is fed from the feed tank 8, must be controlled at the proper rate, depending upon the size of the digester, the length of its sections, the rate of flow of the reaction mixture therethrough, the steam pressure obtaining within the digester, the quantity of steam flowing through the digester and other conditions that will be apparent to one skilled in the art.

As the flow of the oat hulls and the flow of the acid liquid are controllably admitted at a predetermined rate into the digester, the control valves 32 and 33 are partly opened and regulated to maintain a steam flow at the rate of from 1 to 3 pounds of steam for each pound of oat hulls supplied to the digester and, at the same time, to maintain a steam pressure of from 50 to 150 pounds per square inch. The rate of rotation of the paddles 14 and 15 is also controlled in order to insure thorough intermixing of the steam with the reaction mixture. The aforesaid conditions are controlled so as to allow substantially all of the furfural-yielding material to be thoroughly acted upon and substantially all of the furfural to be removed from the reaction mixture before the latter is discharged through the egress opening 13. I have found under the conditions stated above and when a steam pressure of 125 pounds is maintained within the digester that about about two hours' time is required to ensure a substantially complete removal of the furfural. When a steam pressure of about 60 pounds is used, the reaction mixture should be retained in the digester for about 5 to 6 hours. The vapors passing from the vapor outlet 31 to the distilling apparatus are substantially uniform in composition and contain a high furfural content at all times. The materials discharged through the egress opening 11 are substantially free from furfural. The paddles 14 and 15 not only serve as a means for advancing the reaction mixture through the digester but also serve to effect a very intimate intermixing between the reaction mixture and the steam which, at all times, is flowing within the digester counter to the direction of flow of the furfural-yielding material.

In my new process, when employing oat hulls as the furfural-yielding material, I prefer to operate with a constant steam-hull ratio. For any given ratio the composition of the distillate will be substantially uniform. Generally speaking, the lower the steam-hull ratio the richer the distillate in furfural, and the less steam required per pound of furfural recovered. As the steam-hull ratio is increased, I have found that the yields of furfural per unit of hulls used is also increased; i. e., within the range commensurate with commercial requirements. It will be evident, therefore, that relative to the steam-hull ratio to be used my new process has a wide flexibility and that the ratio may be increased as far as the increased yields of furfural warrant. I prefer to operate with a steam-hull ratio of from 1:1 to 3:1. With the former I obtain a furfural yield of 10# per 100# of hulls used, and this yield may be increased to 14# of furfural with a steam-hull ratio of 3:1. While a higher or lower ratio may be used, I have found that these ratios are very well suited to commercial requirements, but it is to be understood that I am not to be limited to the above-mentioned specifications.

The distilling apparatus which is supplied through the pipe line 31 may be similar to that shown in my copending application Serial No. 163,587, filed January 26, 1927.

My present process, as herein described, provides for the furfural-yielding materials to be fed into, conveyed through and discharged from the digester in a continuous manner and during the travel of the reaction mixture through the digester the same is subjected to steam flowing counter to the direction of travel of the furfural-yielding materials. In this manner, furfural is formed and removed from the reaction mixture in a continuous and efficient manner which results in a low steam consumption per pound of furfural formed and recovered from the digester.

It is to be understood, of course, that the materials and the quantities thereof, as hereinbefore described, may be varied within wide limits. Similarly, the time of flow of the reaction mixture through the digester and the steam pressure may be likewise varied. These conditions are all interdependent and, of course, it is to be understood that my present process is not limited to the specific quantities and proportions of materials referred to in the foregoing specific illustrative example.

By reason of my present process, I am able to procure a distillate which is both rich in furfural and substantially uniform in composition. The live steam supplied to the digester through the steam inlet 30 is first brought into contact with reaction materials that possess a low furfural content. The reaction materials brought into contact with the steam as it passes through the digester possess increasing increments of furfural up to the vapor outlet 31 where the unspent reaction materials are brought into contact with the vapors possessing the highest furfural content.

In my process the materials are held within the digester until substantially all of the furfural-yielding materials have been converted into furfural and, simultaneously, sufficient steam is passed counter to the direction of travel of said materials to remove the furfural from said materials substantially as quickly as formed. I have found that after a certain initial time of reaction that the rate of the formation of the furfural, as well as the concentration of furfural in the materials, reach their maximum and then fall off toward zero by the time the materials are discharged from the digester. I have further found that the steam which is free of furfural when admitted to the digester, vaporizes the furfural formed in the materials and carries it along the digester, so that the steam on its travel through the digester, in which it is thoroughly intermixed with the materials, gradually increases in furfural content. I have also found under this method of operation that the furfural content of the steam, the furfural content of the materials and the rate of formation of furfural reach their maximum substantially at the same place in the digester or, in other words, that the zone of maximum rate of formation of furfural and the zones where the materials and vapor reach their maximum furfural content, substantially coincide.

In my new improved process I withdraw the vapors from or adjacent to this zone. Furthermore, the ratio of steam used to materials being processed is such that equilibrium between the furfural content of the vapors and the furfural content of the materials is closely approached. I prefer to use an excess of steam over and above that required to satisfy this equilibrium so that the preponderant direction of travel of the furfural is from the materials to the vapor and equilibrium is approached but not reached in the zone of maximum furfural formation. Operating in this way, I obtain a distillate rich in furfural and substantially uniform in composition.

By reason of my present invention in which the furfural-yielding materials are processed so that the furfural is formed and removed from said materials which are continuously fed into, through, and from a digester, I am able to obtain high yields of furfural in a distillate which is both rich in furfural and substantially uniform in composition. My new process is mainly distinguished from former processes in that the steam and furfural materials pass counter to each other, and in that the furfural-bearing vapors are withdrawn from the reaction chamber only in or adjacent to that zone where the rate of formation of furfural, the furfural content of the reaction mixture and of the vapors approach their maximum. Of course, other distinctions exist between my present invention and the prior art pertaining to the manufacture of furfural.

While I have herein described one embodiment of my invention, it is to be understood that many modifications may be made therein without departing from the spirit and scope of the appended claims.

I claim:

1. The process for continuously forming and removing furfural from a mass of oat hulls which comprises intermixing said oat hulls with a quantity of a dilute non-volatile acid, maintaining this mixture under substantial superatmospheric pressure while positively and continuously propelling this reaction mixture through a gas tight digester wherein it is subjected to the action of heat for forming the furfural, and removing the furfural from the mass of oat hulls by subjecting the said reaction mixture to a continuous flow of steam through the digester which traverses the same counter to the direction of movement of said reaction material therethrough.

2. The process of continuously forming and removing furfural of a substantially uniform composition which comprises intermixing a furfural-yielding material with a suitable acid liquid, maintaining this mixture under substantial superatmospheric pressure while positively and continuously propelling it through a gas tight digester, passing steam continuously through the digester counter to the direction of travel of the said mixture therethrough, and withdrawing the steam from the said digester adjacent to the zone of the reaction mixture where the rate of formation of furfural, the furfural content of the reacting materials and of the furfural laden vapors approach their maximum.

3. The process for continuously forming and removing furfural of a substantially uniform composition from furfural-yielding material which comprises intermixing said material with a suitable dilute acid, maintaining this reaction mixture under substantial superatmospheric pressure while subjecting it to the continuous action of heat, and a current of steam while positively and continuously propelling said reaction mixture through a digester, said current of steam flowing continuously through said digester counter to the direction of travel of said mixture therethrough, and withdrawing the steam from the said digester adjacent to the zone of the reaction mixture where the rate of formation of furfural, the furfural content of the reacting materials and of the furfural laden vapors approach their maximum.

4. The process for continuously forming and removing furfural of a substantially uniform composition from furfural-yielding materials which comprises intermixing said materials with a suitable dilute acid, continuously maintaining this reaction mixture under substantial superatmospheric pressure while subjecting it to the action of heat and pressure while positively and continuously propelling said reaction mixture through a gas tight digester, thoroughly intermixing said reaction mixture with a current of steam which is passed continuously through said digester counter to the direction of flow of said material therethrough, and withdrawing the steam from the said digester adjacent to the zone of the reaction mixture where the rate of formation of furfural, the furfural content of the reacting materials and of the furfural laden vapors approach their maximum.

5. The process for continuously forming and removing furfural of a substantially uniform composition from furfural-yielding materials which comprises intermixing said materials with a liquid and a suitable catalyst for the reaction, continuously maintaining this mixture under a substantial superatmospheric pressure while subjecting it to the action of heat while positively and continuously passing said mixture through a gas tight digester, thoroughly intermixing said mixture with a current of steam that passes continuously through said digester counter to the direction of flow of said material therethrough, and withdrawing the steam from said digester adjacent to the zone of the reaction mixture where the rate of formation of furfural, the furfural content of the reacting materials and of the furfural laden vapors approach their maximum.

6. The process for continuously forming and removing furfural of a substantially uniform composition from furfural-yielding materials which comprises intermixing said materials with less than 50% of their weight of water and a suitable acid, positively propelling this reaction mixture continuously through a gas tight digester while subjecting said mixture to the action of heat and maintaining it continuously under superatmospheric pressure, introducing into said digester a continuous flow of steam which passes therethrough counter to the direction of flow of the reaction mixture through said digester, and withdrawing the steam from the said digester adjacent to the zone of the reaction mixture where the rate of formation of furfural, the furfural content of the reacting materials and of the furfural laden vapors approach their maximum.

HAROLD J. BROWNLEE.